United States Patent
Quattrocchi

(10) Patent No.: US 9,076,346 B2
(45) Date of Patent: Jul. 7, 2015

(54) MUSIC WHEEL—METHOD AND APPARATUS OF A MUSIC LEARNING TOOL

(71) Applicant: MIQ LIMITED, Hong Kong (HK)

(72) Inventor: Giovanni Saint Quattrocchi, Hong Kong (HK)

(73) Assignee: MIQ LIMITED, Hong Kong (CN)

( * ) Notice: Subject to any disclaimer, the term of this patent is extended or adjusted under 35 U.S.C. 154(b) by 0 days.

(21) Appl. No.: 14/372,455

(22) PCT Filed: Jan. 21, 2013

(86) PCT No.: PCT/CN2013/070794
§ 371 (c)(1),
(2) Date: Jul. 16, 2014

(87) PCT Pub. No.: WO2013/107424
PCT Pub. Date: Jul. 25, 2013

(65) Prior Publication Data
US 2015/0007707 A1    Jan. 8, 2015

Related U.S. Application Data
(60) Provisional application No. 61/588,655, filed on Jan. 20, 2012.

(51) Int. Cl.
G09B 15/02    (2006.01)
G09B 15/00    (2006.01)

(52) U.S. Cl.
CPC ............ *G09B 15/002* (2013.01); *G09B 15/023* (2013.01)

(58) Field of Classification Search
CPC .............................. G09B 15/026; G09B 26/03
See application file for complete search history.

(56) References Cited

U.S. PATENT DOCUMENTS

| | | | | |
|---|---|---|---|---|
| 3,572,205 A * | 3/1971 | Scholfield | ........................ | 84/474 |
| 4,305,323 A * | 12/1981 | Graham | ......................... | 84/474 |
| 4,716,806 A * | 1/1988 | Forrest | ............................ | 84/474 |
| 4,881,443 A * | 11/1989 | Bertram | ........................ | 84/473 |
| 4,887,507 A * | 12/1989 | Shaw | ................................ | 84/474 |
| 5,288,234 A * | 2/1994 | Hamzi | ......................... | 434/404 |
| 5,320,020 A * | 6/1994 | Corley | ............................ | 84/474 |
| 5,709,552 A * | 1/1998 | LeGrange | ................... | 434/404 |
| 6,031,172 A * | 2/2000 | Papadopoulos | ............. | 84/470 R |
| 7,141,731 B2 * | 11/2006 | Vallery | ........................... | 84/474 |
| 8,455,747 B2 * | 6/2013 | Lozano, Jr. | .................. | 84/471 R |
| D710,367 S * | 8/2014 | Quattrocchi | ................ | D14/485 |
| 2011/0167987 A1 | 7/2011 | Lozano | | |
| 2015/0007707 A1 * | 1/2015 | Quattrocchi | ............... | 84/477 R |

FOREIGN PATENT DOCUMENTS
WO    9912142 A1    3/1999

\* cited by examiner

*Primary Examiner* — Robert W Horn
(74) *Attorney, Agent, or Firm* — Ella Cheong Hong Kong; Sam T. Yip

(57) ABSTRACT

A Music Wheel user interface or apparatus having a substantially flat surface area and being formed by a plurality of wheels stacked on top of each other. Each wheel can independently move in clockwise and anticlockwise directions. The face of each wheel displays relevant and fundamental information for musical instructions. Certain parts of the faces of certain wheels are cut out, or have windows, allowing the inscriptions of pitches or key tonalities letter, number, and symbol notes on the faces of the wheels at the bottom to be seen. The sizes of the wheels are ascending from top to bottom to allow the inscriptions on the rim of the wheels at the bottom to be seen. During operation, at least one wheel is stationary and three are movable. All moving parts can move independently of each other.

4 Claims, 7 Drawing Sheets

MUSIC WHEEL—METHOD AND APPARATUS OF A MUSIC LEARNING TOOL

FIELD OF THE INVENTION

The present invention relates generally to music theory, musical instruments, and the making and performance of music. Particularly, the present invention relates to the music education teaching aid and methodology.

BACKGROUND

The circle of fifth is a popular tool in music theory. In brief, the circle of fifth is a visual representation of the music relationships among the twelve tones of the chromatic scale, their corresponding key signatures, and the associated major and minor keys. The visual representation is such that a sequence of pitches or key tonalities letter, number, and symbol notes form the shape of a circle. The placement of the letter, number, and symbol notes on the circle further signifies the relationships between the pitches and tones. The circle of fifth and its variants are often used as teaching aids in the learning of music. However, to understand the working of the circle of fifth requires substantial training Even experienced musician would find the circle of fifth unintuitive and inconvenient to use. As such, there is an unmet need for a musical tool that is easy to use, intuitive, and readily understandable by novice and professional musician alike.

SUMMARY

It is the objective of the present invention to provide a music education teaching aid and methodology referred to as the Music Wheel. The Music Wheel can be realized by electronic means including, but are not limited to, Internet web application running within a web page and accessible through an Internet browser running in a personal computer or laptop computer, a software application installed running in a computing device, mobile application (apps) running within a mobile computing/communication device. The Music Wheel can also be realized by a physical apparatus with mechanical moving parts.

A preferred embodiment of the Music Wheel has a substantially flat surface area formed by a plurality of wheels stacked on top of each other. Each wheel can independently move in clockwise and anticlockwise directions. The face of each wheel displays relevant and fundamental information for musical instructions. Certain parts of the faces of certain wheels are cut out, or have windows, allowing the inscriptions of pitches or key tonalities letter, number, and symbol notes on the faces of the wheels at the bottom to be seen. The sizes of the wheels are ascending from top to bottom to allow the inscriptions on the rim of the wheels at the bottom to be seen. During operation, at least one wheel is stationary and three are movable, which are essential to its methodology. All moving parts can move independently of each other.

BRIEF DESCRIPTION OF THE DRAWINGS

Embodiments of the invention are described in more detail hereinafter with reference to the drawings, in which.

DETAILED DESCRIPTION

In the following description, methods, apparatus, and systems for the Music Wheel teaching aid and methodology are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention can be realized by electronic means. The electronic means include, but not limited to, Internet web application running within a web page and accessible through an Internet browser running in a personal computer or laptop computer, a software application installed running in a computing device, mobile application (apps) running within a mobile computing/communication device such as the Apple® iPad®, Apple iPhone®, Samsung® Galaxy®, Google Nexus®, and other commercially available devices. The present invention can also be realized by a physical apparatus with mechanical moving parts. Nonetheless, both realizations of the present invention employ the same inventive steps and principles in operation. To better describe the present invention, references to both the physical and electronic embodiments are made in this document.

Figure 1:
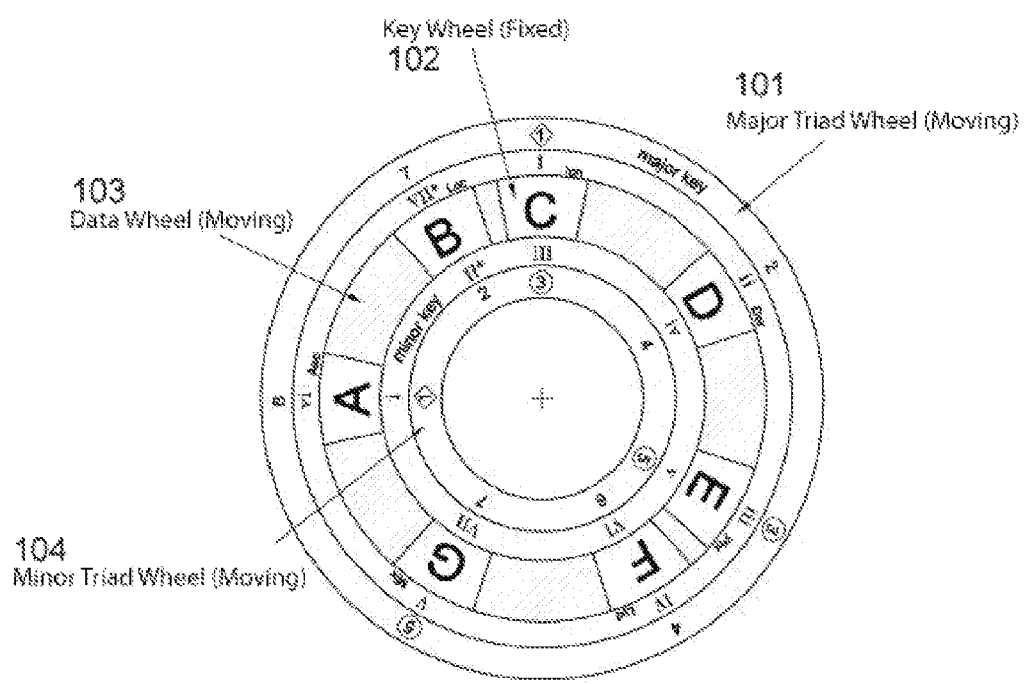
FIG. 1 shows a diagram illustrating the Music Wheel assembly in accordance to an embodiment of the present invention.

Referring to FIG. 1. A preferred embodiment of the Music Wheel is shown having a substantially flat surface area formed by a plurality of wheels stacked on top of each other. Each wheel can independently move in the clockwise and anticlockwise directions. The face of each wheel displays relevant and fundamental information for musical instructions. Certain parts of the faces of certain wheels are cut out, or have windows, allowing the inscriptions of pitches or key tonalities letter, number, and symbol notes on the faces of the wheels at the bottom to be seen. The sizes of the wheels are ascending from top to bottom to allow the inscriptions on the rim of the wheels at the bottom to be seen. During operation, at least one wheel is stationary and three are movable, which are essential to its methodology. All moving parts can move independently of each other moving part.

Although this preferred embodiment is showing a circular shaped device, the shape of the wheels of the Music Wheel are not restricted to circle or any particular shape or even to the same shape as long as the shapes are substantially symmetrical supporting a centered pivotal point.

Still referring to FIG. 1. The preferred embodiment of the Music Wheel comprises at least a Key Wheel 102, a Data Wheel 103, a Major Triad Wheel 101, and a Minor Triad Wheel 104. In this embodiment, the stationary part is the Key Wheel 102 and the movable parts are: the Data Wheel 103, Major Triad Wheel 101, and Minor Triad Wheel 104. Beginning on top (first) position, "C", the Music Wheel displays the family (or key) of C and all the relevant information for the musician to view at one time. Certain parts of the face of the Data Wheel 103 are cut out in order to shown the inscribed letters on the fixed Key Wheel 102 beneath. As the Data Wheel 103 rotates, different combinations of letters on Key Wheel 102 are shown. By rotating any of the Data Wheel, Major Triad Wheel, and Minor Triad Wheel, the musician can instantly view all the relevant information for any family (or key), and create new chords with their extensions. The relative minor key can be easily located with the same information accessible. Information such as scale notes, scale modes, chord notes, chord quality, chord and note position are all displayed.

Figure 2:
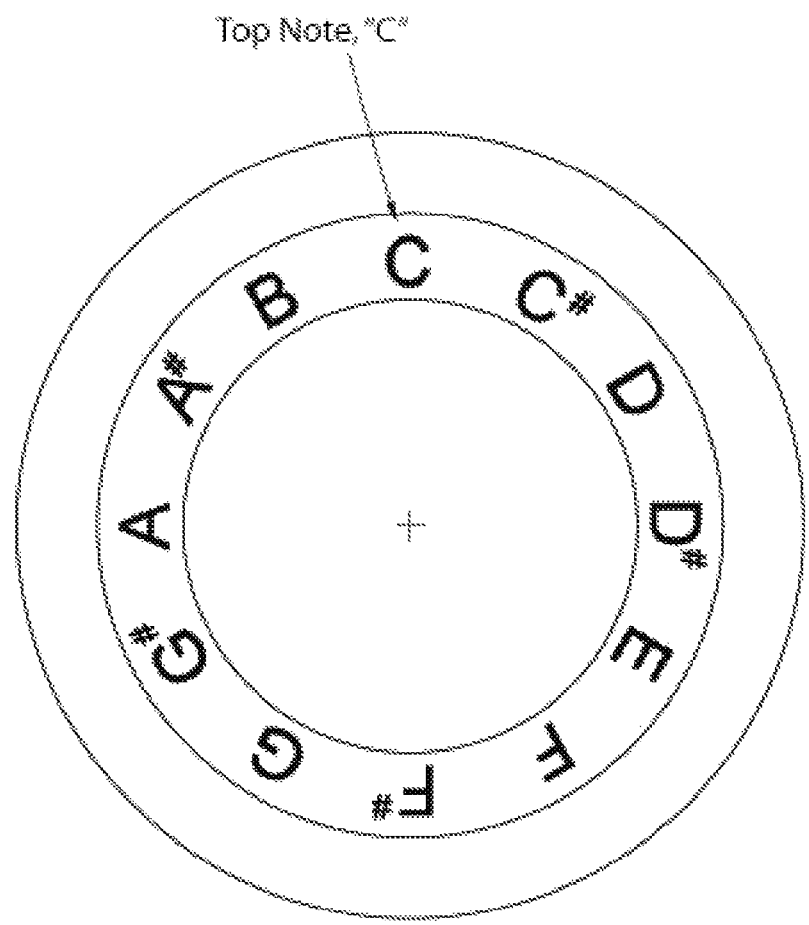
FIG. 2 shows a diagram illustrating the Key Wheel as a standalone wheel separated from the Music Wheel assembly in accordance to an embodiment of the present invention.

FIG. 2 shows the Key Wheel as a standalone wheel with its inscribed letters without obstruction separated from the Music Wheel assembly for better observation. The Key Wheel is the base/foundation layer of the Music Wheel. Each note of the chromatic musical scale is displayed clockwise, evenly distributed, $360°$, starting from "C", the top note (or key) at the twelve o'clock position. In this embodiment, twelve o'clock is "C", three o'clock is "D#", six o'clock is "F#", and nine o'clock is "A".

Figure 3:
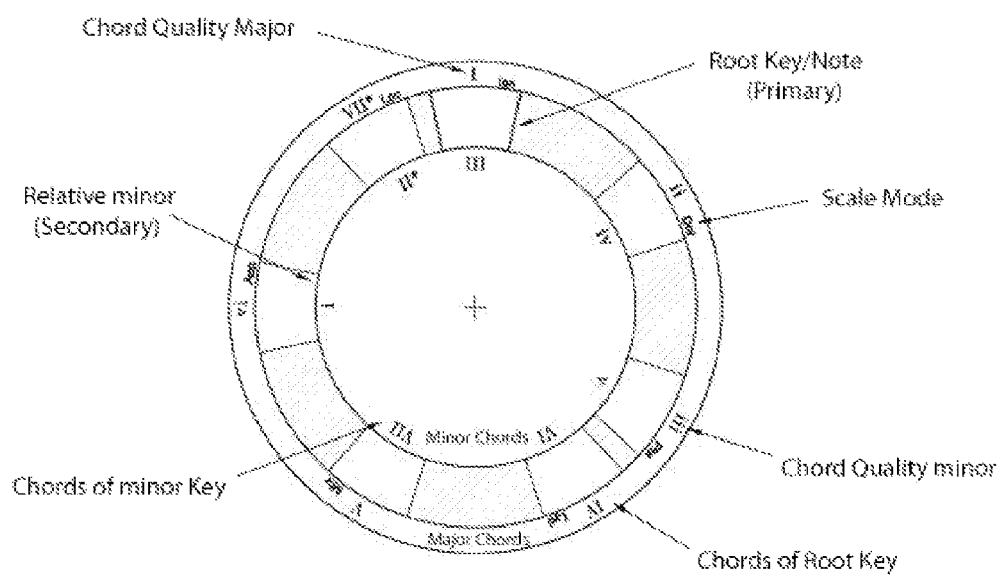
FIG. 3 shows a diagram illustrating the Data Wheel as a standalone wheel separated from the Music Wheel assembly in accordance to an embodiment of the present invention.

FIG. 3 shows the Data Wheel as a standalone wheel separated from the Music Wheel assembly for better observation. The Data Wheel is a fundamental part of the Music Wheel. It rotates in both directions revealing the family of notes for each key. It displays chord quality (for the entire family), scale modes, the root key/note, and its relative minor for the key. In this embodiment, "Chord Quality Major" is represented by uppercase Roman numerals. "Root Key/Note" at the first position (twelve o'clock) is highlighted as primary, with surrounding bold-line box. "Scale Mode" is represented by alpha symbols. "Chord Quality minor" is represented by lowercase Roman numeral. "Chords of Root Key" represents chords within the major key. "Chords of minor Key" represents chords within the relative minor key. "Relative minor" is at the sixth position (nine o'clock) is highlighted as secondary, with bold-line.

Figure 4:
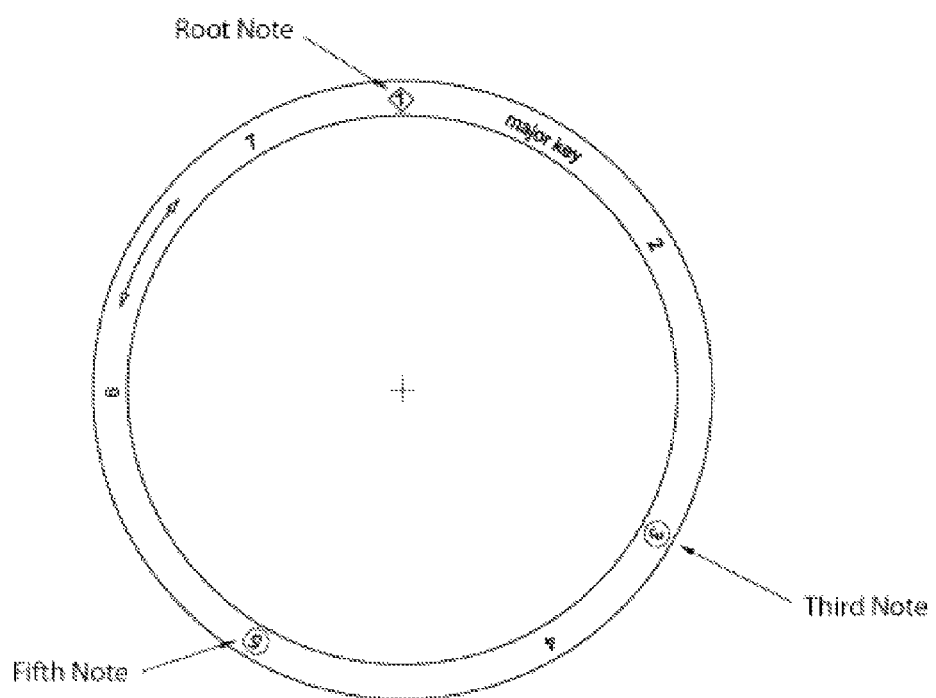
FIG. 4 shows a diagram illustrating the Major Triad Wheel as a standalone wheel separated from the Music Wheel assembly in accordance to an embodiment of the present invention.

FIG. 4 shows the Major Triad Wheel as a standalone wheel separated from the Music Wheel assembly for better observation. The Major Triad Wheel rotates in the clockwise and anticlockwise directions. It displays the major triad chord for each note within the key by highlighting the numbers 1, 3, and 5. The Major Triad Wheel is not limited to showing triad chords only. By using the numbers on the wheel, major chord extensions, for instance the major$7^m$, sus4, and sus2 cord extensions, can easily be recognized. In this embodiment, "Root Note", 1, is the first note in the major triad chord. "Third Note", 3, is the third note in the major triad chord. "Fifth Note", 5, is the fifth note in the major triad chord.

Figure 5:
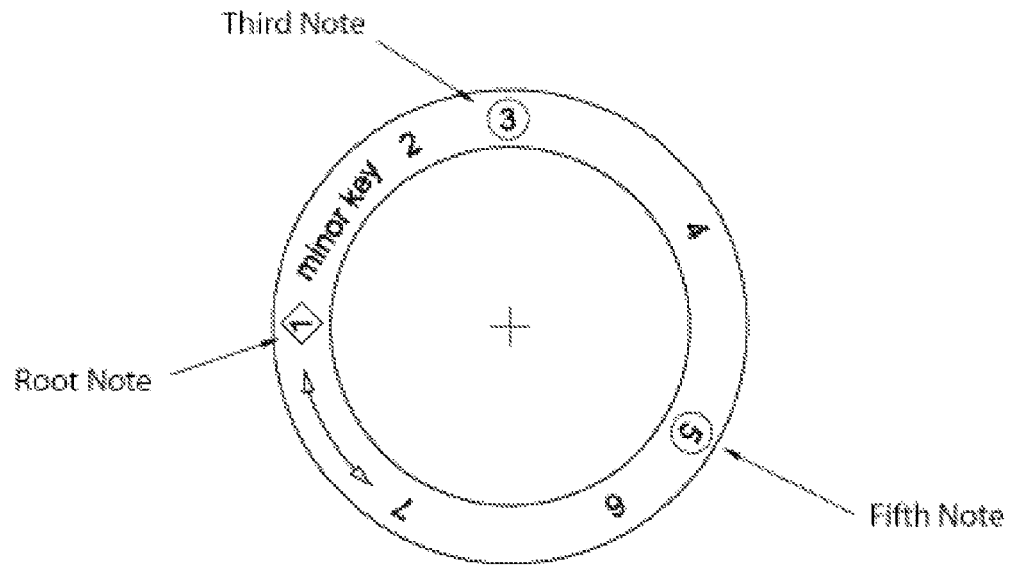
FIG. 5 shows a diagram illustrating the Minor Triad Wheel as a standalone wheel separated from the Music Wheel assembly in accordance to an embodiment of the present invention.

FIG. 5 shows the Minor Triad Wheel as a standalone wheel separated from the Music Wheel assembly for better observation. The Minor Triad. Wheel rotates in the clockwise and anticlockwise directions. It displays the minor triad chord for each note within the relative minor key highlighted by the numbers 1, 3, and 5. The Minor Triad Wheel is not limited to showing the triad chords only. By using the numbers in the wheel, minor chord extensions such as the minor$7^{th}$ minor chord extension can be recognized. In this embodiment, "Root Note", 1, is the first note in the minor triad chord. "Third Note", 3, is the third note in the minor triad chord. "Fifth Note", 5, is the fifth note in the minor triad chord.

Figure 6:
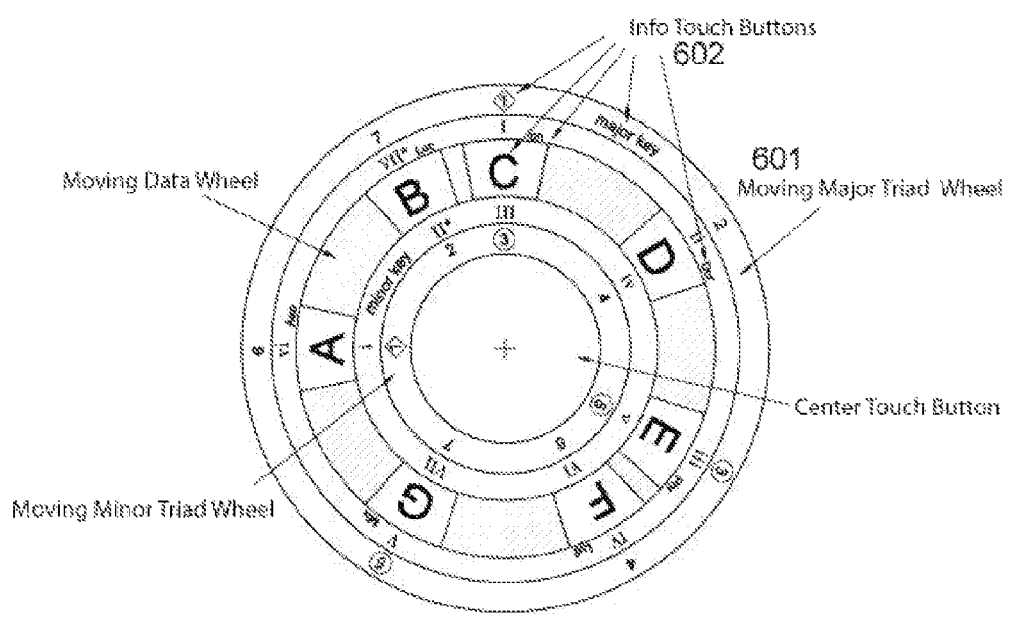
FIG. 6 shows a diagram illustrating the main graphical user interface of the Music Wheel in accordance to an electronic embodiment of the present invention.

Referring to FIG. 6. The appearance of the plurality of wheels stacked on top of each other can be achieved by a graphical user interface displayed in an electronic display. The moving parts can be shown as graphical user interactive elements and interact with user input such as mouse click action, mouse double-click action, mouse click-and-drag action, touch-screen contact, motion detection, voice command, and/or other user input means providing the graphical feedback rotational movement of the wheels away and into the "Key" positions accordingly. This will allow the musician to learn and react without mental or "inner-mind" time lag, crucial to the device's successful use; and evolve with clearer vision and confidence. Each digital number, roman numeral, alpha code, and note graphical user interactive element can be selected to reveal detailed information to guide the musician in the learning and deeper understanding of music theory and harmony. In this embodiment: the "Center Touch Button" 601—when selected this button will revert the device to its initial (or "home") position; "Info Touch Buttons" 602—when selecting any of these buttons, detailed information will be revealed; and all wheels can be rotated in either direction using various computer methods and user interaction such as mouse click action, mouse double-click action, mouse click-and-drag action, touch-screen contact, motion detection, voice command and/or other user input means.

Figure 7:
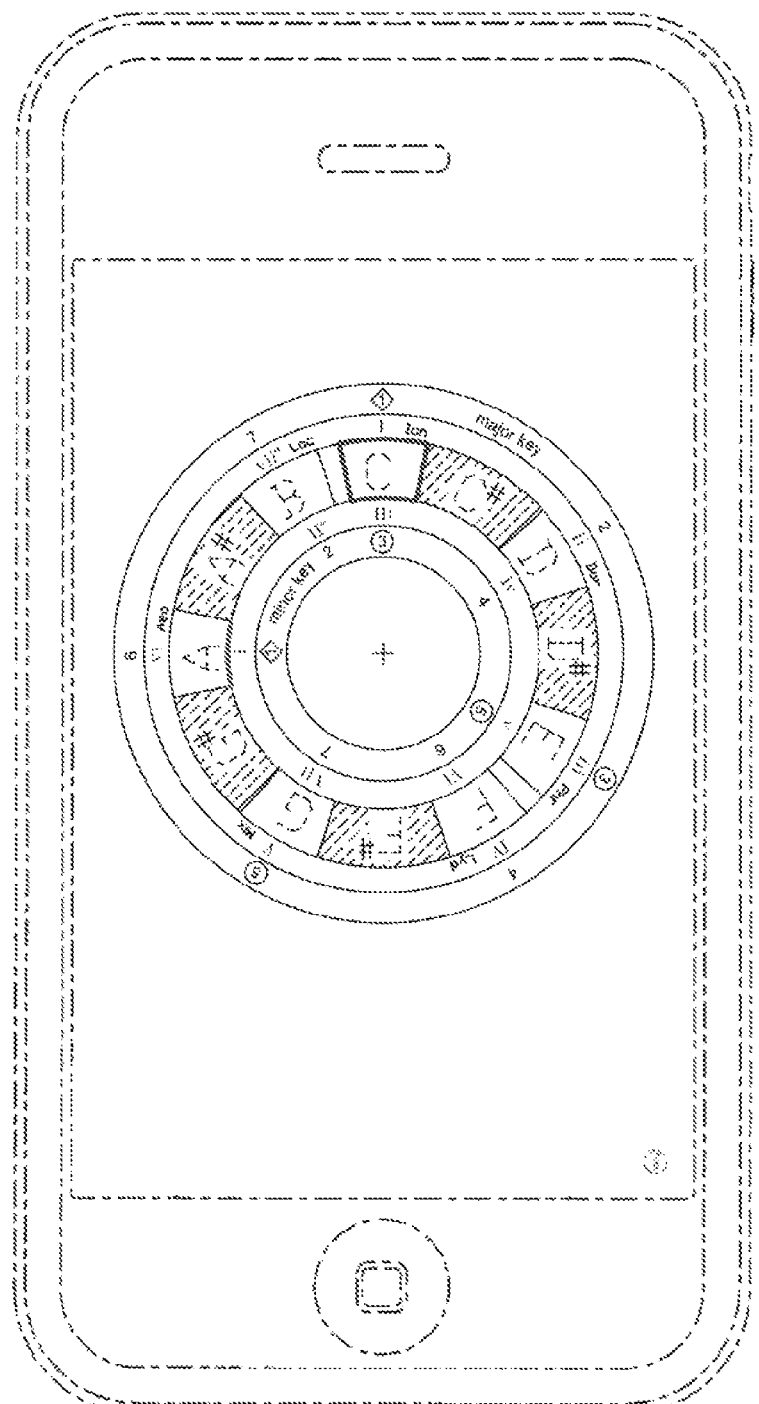
FIG. 7 shows a diagram illustrating the main graphical user interface of an electronic embodiment of the Music Wheel implemented as an Apple® iPhone® mobile application (apps) for experienced or professional musician.
Figure 8:
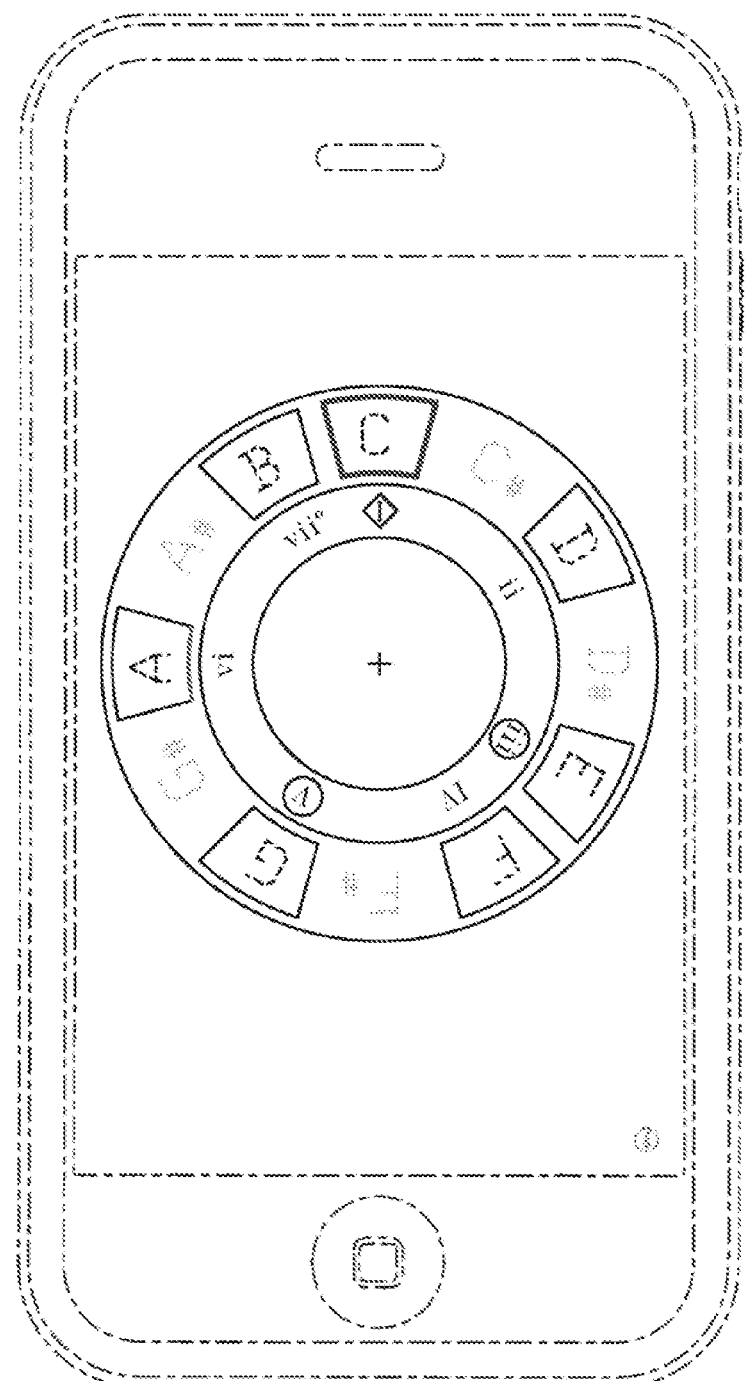
FIG. 8 shows a diagram illustrating the main graphical user interface of another electronic embodiment of the Music Wheel implemented as an Apple® iPhone® mobile application (apps) for amateur or beginner musician.

FIG. 7 shows the main graphical user interface of an electronic embodiment of the Music Wheel implemented as an Apple® iPhone® mobile application (apps) for experienced or professional musician. FIG. 8 shows the main graphical user interface another electronic embodiment of the Music Wheel implemented as an Apple® iPhone® mobile application (apps) for amateur or beginner musician. The graphical user interface of the electronic embodiments of the Music Wheel can also include one or more user-selectable animated images of musical instruments. The graphical user interface can then animate the finger positioning and movements for the various chords and chord extensions on the selected musical instrument, when the corresponding chords and chord extensions are selected on the Music Wheel. The sound of the selected musical instrument for the selected chord or chord extension can also be played with or without the animation of the finger movements. Other embodiments of the Music Wheel include at least one for children with a more colorful and playful graphical user interface and one for adult with more informative graphical user interface suited for adult-learning methods. An electronic embodiment of the Music Wheel can also be integrated within a musical instrument such as a piano or an electric guitar.

The various electronic embodiments of the Music Wheel disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In the various electronic embodiments of the Music Wheel, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data. The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer implementable method for providing a music education teaching tool, comprising:
   generating, by a computer processor and in a electronic display, a graphical user interface of circular shape, wherein the graphical user interface comprises:
     a first wheel displaying letters and symbols for musical notes on its face;
     a second wheel having windows, being stacked on top of the first wheel showing some of the music chord letters while concealing others, and displaying numerals for musical chord quality minors and chords of minor key on its face;
     a third wheel displaying numbers for musical major triad chords for each note on its face and encircling the first and the second wheels; and
     a fourth wheel displaying numbers for musical minor triad chords for each note on its face and encircling the third wheel;
     wherein the first wheel being stationary, the second, third, and forth wheels can rotate about a vertical axis clockwise and anticlockwise independently;
   receiving, by a computer processor, user inputs;
   rotating, the second, third, or forth wheel according to the user inputs.

2. The method of claim 1, wherein the graphical user interface further comprises a first touch button, wherein when selected, the first, second, third, and forth wheels return to their respective initial positions.

3. The method of claim 1, wherein the graphical user interface further comprises one or more second touch buttons, wherein when selected, detailed information about its associated musical note, musical chord quality minor, musical chord of minor key, musical major triad chord, or musical minor triad chord is displayed.

4. The method of claim 1, wherein the user inputs being one or more of mouse click actions, mouse double-click actions, mouse click-and-drag actions, touch-screen contacts, motion detections, and voice commands.

* * * * *